June 26, 1956　　　C. H. HUGHES　　　2,752,298
VERTICAL RETORT
Filed April 1, 1953　　　　　　　　8 Sheets-Sheet 1

INVENTOR.
CHARLES. H. HUGHES
BY
A. R. Weller
ATTORNEY

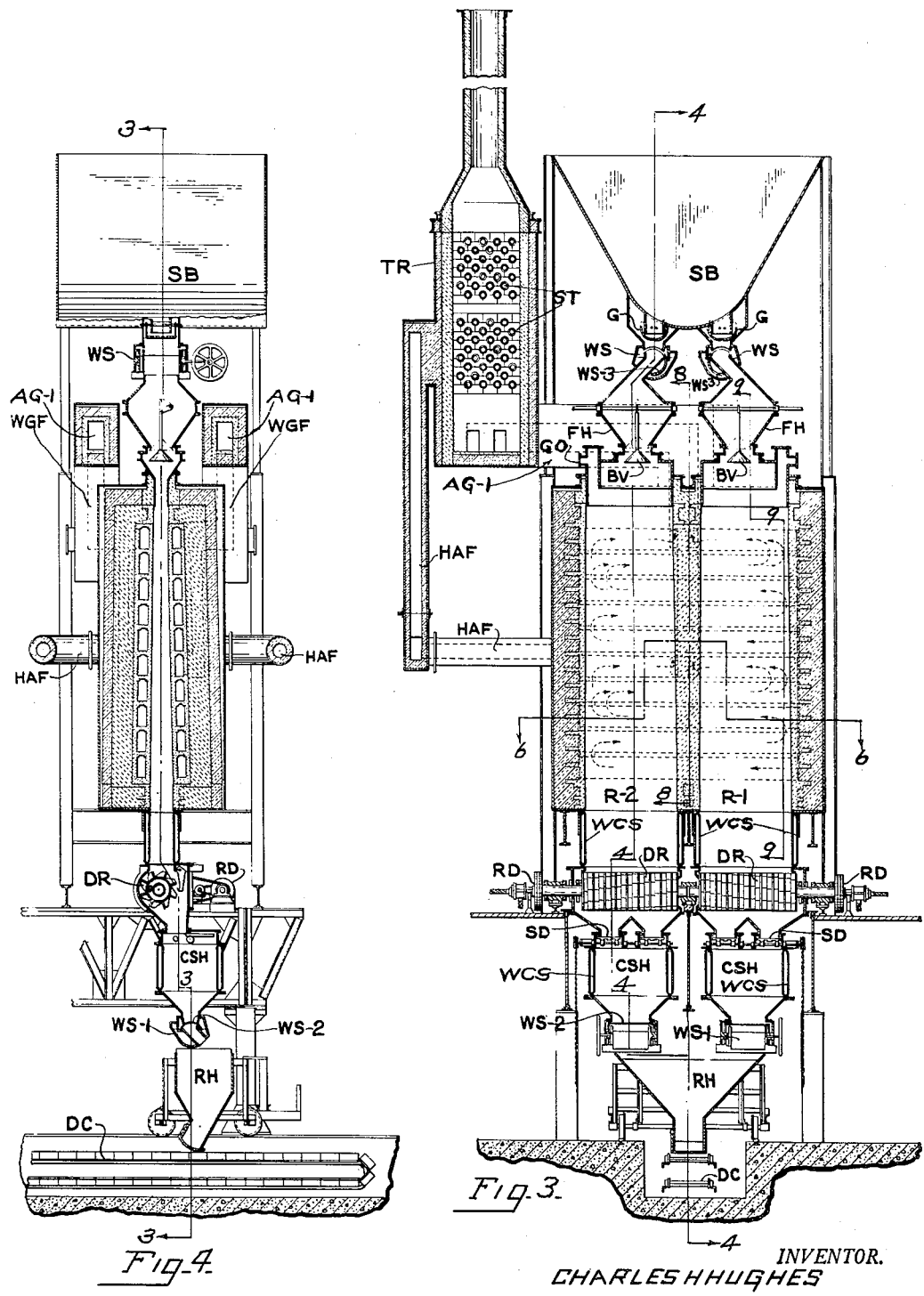

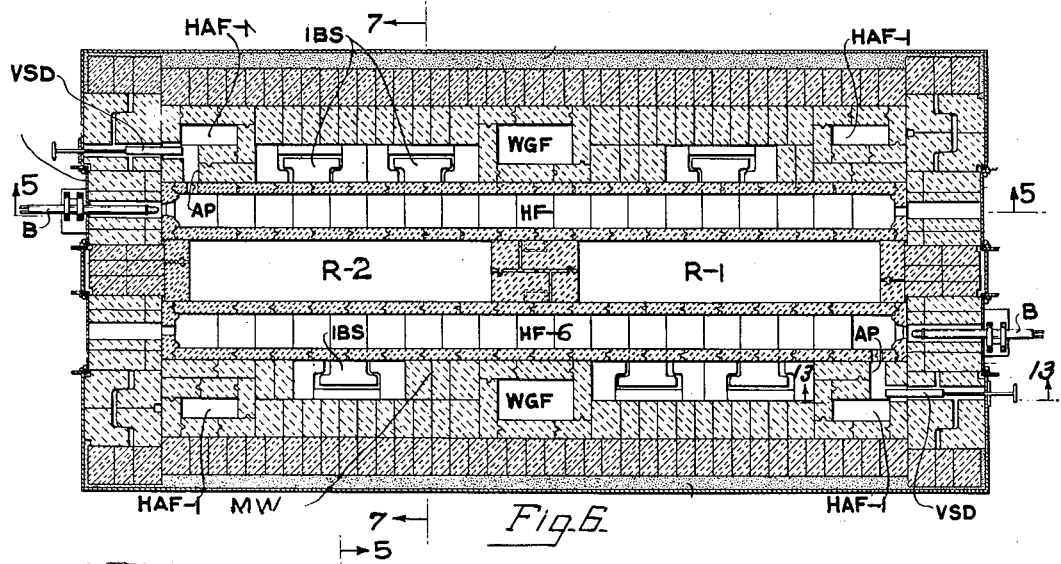
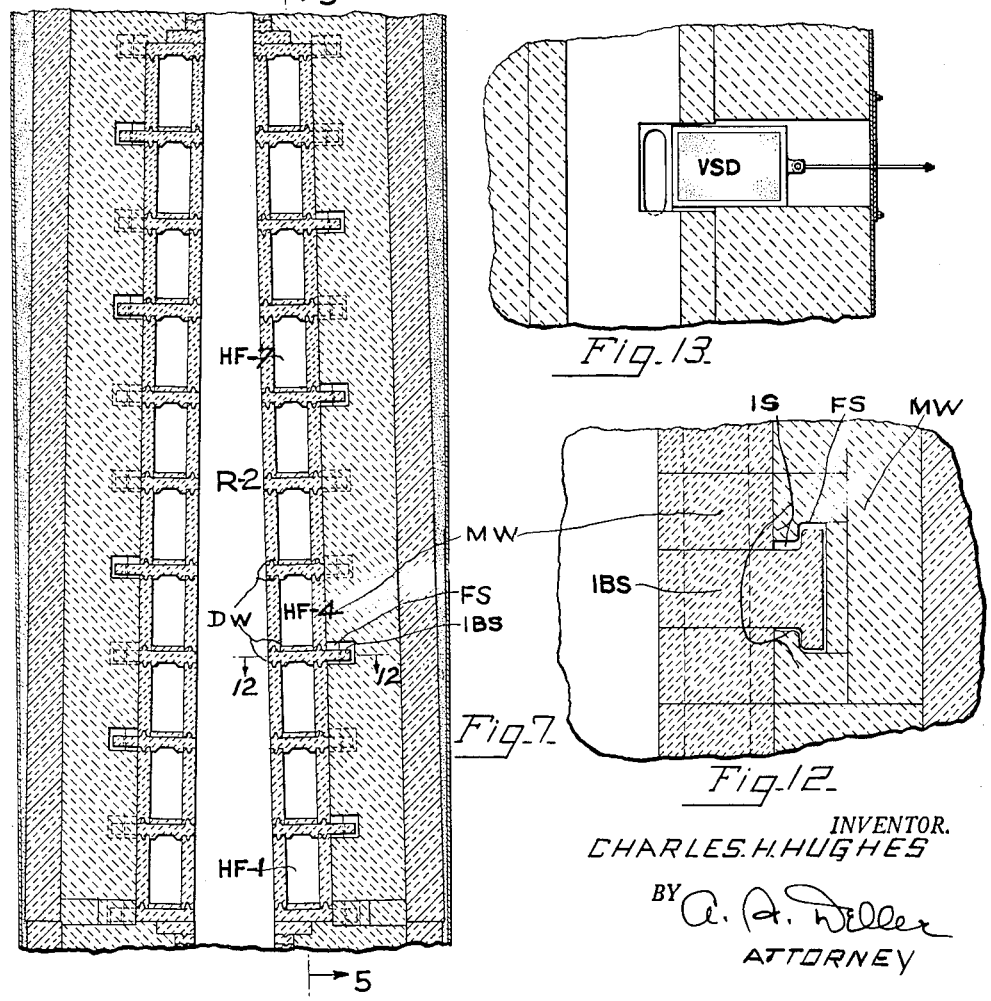

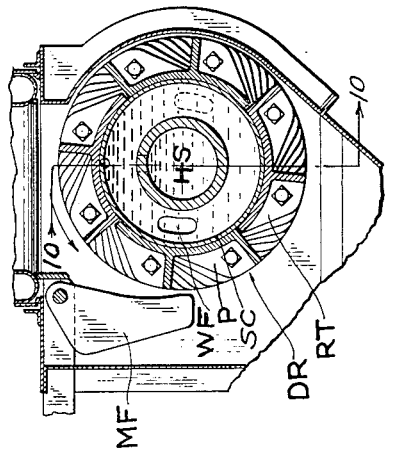
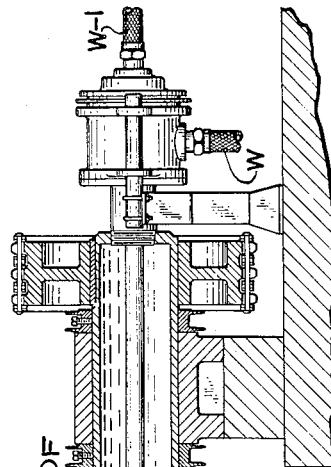
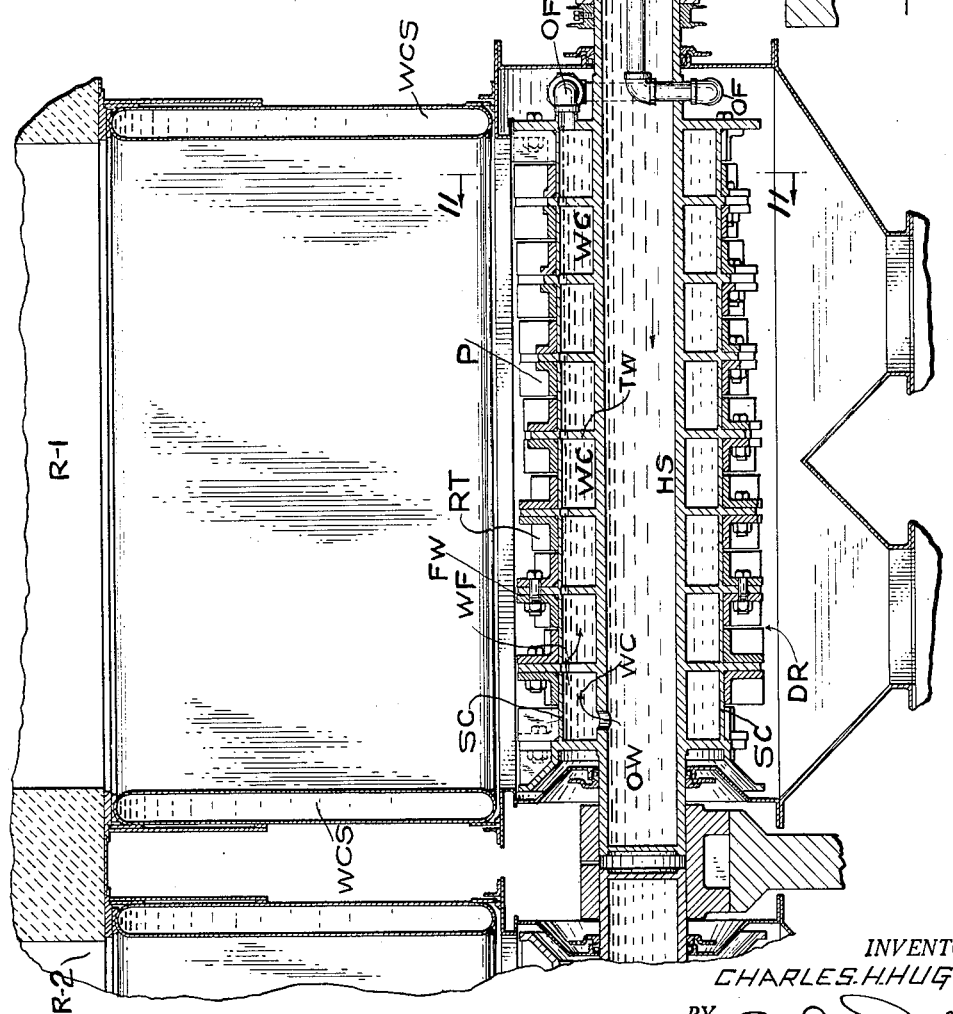

United States Patent Office 2,752,298
Patented June 26, 1956

2,752,298
VERTICAL RETORT

Charles H. Hughes, Glen Ridge, N. J., assignor to Hughes By-Product Coke Oven Corporation, New York, N. Y., a corporation of New York Application April 1, 1953, Serial No. 346,060

8 Claims. (Cl. 202—122)

The present invention relates to an improved vertical retort, and, more particularly, to a continuously operated vertical retort for the production of char, coke, and calcined carbonaceous materials, gas and by-products.

It is well known that vertical retorts have been used in the art for a long time. However, prior vertical retorts were subject to certain disadvantages, drawbacks and shortcomings, as those skilled in the art were well aware. Attempts have been made to overcome the known disadvantages, drawbacks, etc., and various proposals have been made. Although attempts were made to overcome the foregoing difficulties and other disadvantages, none, as far as I am aware, was entirely successful when carried into practice commercially on an industrial scale.

It has now been discovered that an improved retort for heat treating carbonaceous materials, such as low density green petroleum coke, carbon friquettes to increase the density to 2.0 plus and to heat treat sub-bituminous coal for the removal of moisture and volatiles to produce a high carbon, low ash char, etc., has been provided. The improved vertical retort is specially constructed to operate continuously in such a manner that carbonaceous materials traveling in a continuous stream from the supply hopper downward through the externally heated retort are heat treated and are discharged as a finished product via a mechanically operated discharge device into a water-cooled receiving hopper. From this hopper, the cooled product can be discharged intermittently. As those skilled in the art will appreciate, the charging of the carbonaceous material into the receiving hopper can be effected with selected short cycles which are proportioned not only to the discharge of the heat-treated materials but also to the continuous travel of the carbonaceous material through the retort.

It is an object of the present invention to provide an improved vertical retort externally heated by means of a series of horizontal heating flues constructed of silicon carbide refractory material to promote the rapid transfer of heat into the interior of the retort to heat treat carbonaceous material at high temperatures required for calcining, charring and/or coking purposes and/or removing gases and volatiles from carbonaceous material like sub-bituminous coal in the production of char and ranging from about 2000° F. to about 2400° F.

Another object of the present invention is to provide an improved vertical retort with means within the discharge mechanism to lower the temperature of the heat-treated materials to a temperature where the heat-treated material will not ignite when coming into contact with the atmosphere.

It is a further object of the present invention to provide an improved vertical retort having means for using the sensible heat in the hot waste gases from the retort heating flues for preheating the air required for combustion in the heating flues.

The invention also contemplates providing an improved vertical retort having means for permitting sections of the steel shell enclosing the retort to expand as required to compensate for the difference in expansion and growth of the silicon carbide refractories in the heating system and the backup brickwork used in the construction of the retort walls.

The invention further contemplates providing an improved vertical retort with a horizontal heating flue system which will provide for controlling the temperatures in each heating flue from the bottom to the top of the retort in such a manner as to insure uniform transfer of heat uniformly through the silicon carbide heating walls into all parts of the charge within the retort.

It is likewise within the contemplation of the invention to provide an improved vertical retort with means for the control of the preheated air to each burner in each horizontal heating flue.

Still another object of the present invention is to provide an improved vertical retort having a heating flue system common to twin heat-treating chambers.

It is also the purpose of the present invention to provide an improved vertical retort having interlocking brickwork shapes so arranged as to give the heat treating chamber a vertical taper without subjecting the heating flue system to failure by collapse or otherwise and to allow vertical and horizontal expansion of the retort brickwork.

Other objects and advantages of the present invention will become apparent from the following description taken in conjunction with the accompanying drawings, in which:

Fig. 3 illustrates a vertical sectional view taken on the line 3—3 of Fig. 4 through the twin heat-treating chambers;

Fig. 4 shows a vertical cross sectional view taken on the line 4—4 of Fig. 3;

Fig. 6 is a horizontal plan sectional view taken on the line 6—6 of Fig. 3;

Fig. 7 is a vertical cross sectional view taken on the line 7—7 of Fig. 6;

Fig. 10 is a vertical longitudinal sectional view taken on the line 10—10 of Fig. 11;

Fig. 11 is a vertical cross sectional view taken on the line 11—11 of Fig. 10;

Fig. 12 is a sectional view taken on the line 12—12 of Fig. 7; and

Fig. 13 is a sectional view taken on the line 13—13 of Fig. 6.

Figure 1:
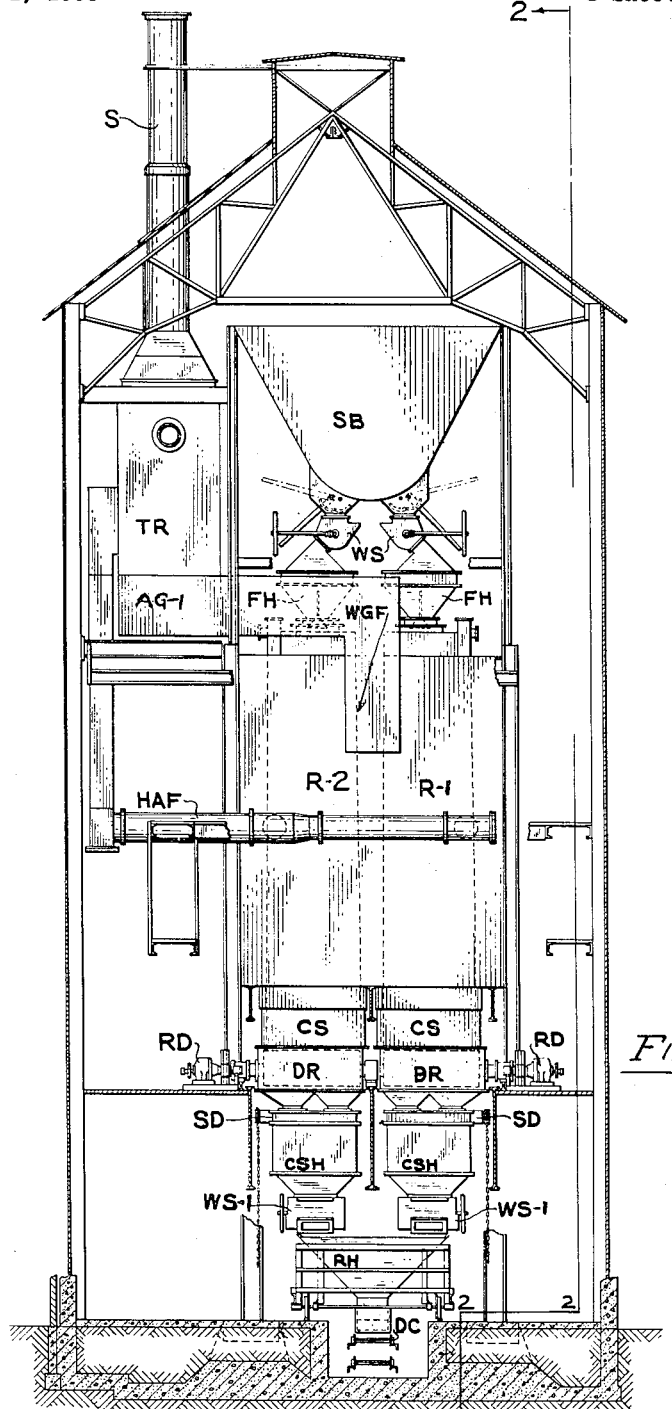
Fig. 1 is a vertical sectional view of an improved vertical retort embodying the present invention and incorporating twin heat-treating chambers in tandem.
Figure 2:
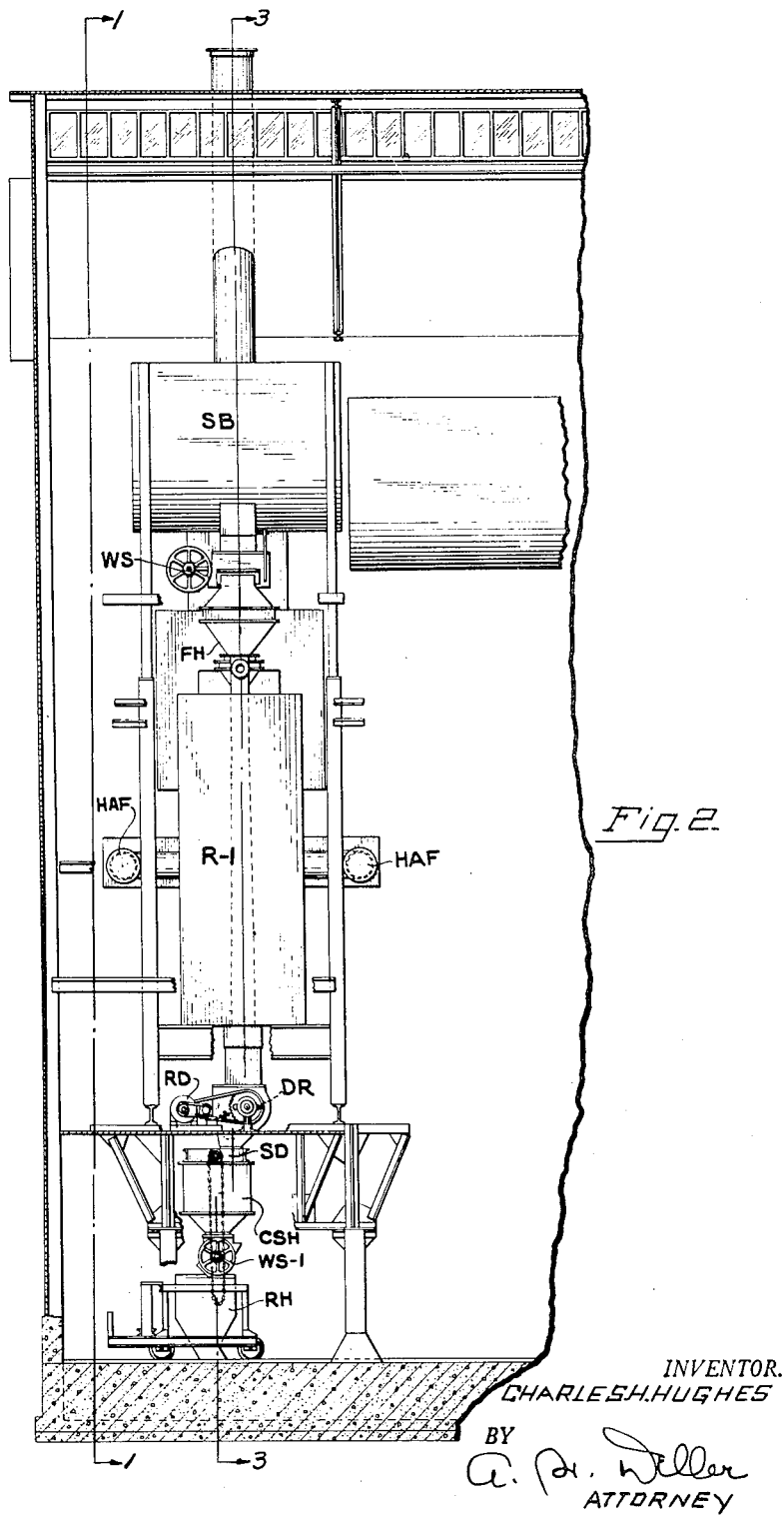
Fig. 2 depicts a vertical sectional view taken on the line 2—2 of Fig. 1.

Broadly stated, the present invention contemplates the conversion of carbonaceous material, such as carbon refuse or residue from petroleum refineries, classified as delayed coker coke, into a calcined coke of high density with a low volatile content and no moisture. As those skilled in the art know, the delayed coker coke is a coke of very low density having a high volatile and high moisture content. The calcined coke is in great demand for use in the manufacture of carbon electrodes for electric furnace operation. This invention can likewise be used to heat treat sub-bituminous coal which contains about 20 to 30% moisture and about 18 to 30% volatile matter and convert it into a char which contains about 96% carbon. Such char can be used, for example, in electric furnaces for burning phosphate rock for the production of fertilizers and in the manufacture of silicon carbide.

In carrying the invention into practice, it is preferred to provide an improved vertical retort capable of yielding controlled temperatures to effect the desired heat treatments of carbonaceous material, such as delayed coker coke or sub-bituminous coal. By controlling the downward flow of the carbonaceous material through twin heat-treating chambers in tandem by means of the water cooled discharged rolls at the bottom of the chambers and by controlling temperatures in the heating flues, the quantity and quality of the final products, such as char, coke, calcined material, etc., is assured. To operate the twin chambers and produce marketable products, it is necessary to control the material going into and coming out of the improved retort on the batch basis. However, the carbonaceous material which is being heat treated in the retort is processed on a continuous basis. In order to accomplish this objective, means are provided to charge the raw material and discharge heat-treated material in such a manner as to prevent air from penetrating or infiltrating the retorts while at the same time making provision for an unobstructed flow of the evolved vapors, such as hydrocarbons and other by-products, and also gases, such as coal gases, from the retorts.

Generally speaking, the present invention contemplates a novel combination of structural elements which is described in detail hereinafter and which is capable of producing new results. In the new construction, twin retorts are specially arranged in tandem and are specially provided with a common circuitous horizontal heating system on both sides of the retorts. It has been found that the size of the retorts must be restricted, particularly the width and the depth. For best results in industrial practice, the width of the retort is to be restricted to about six feet and the depth to about one-two feet, say about one foot two inches or one foot four inches. By so doing, the heat processed or treated material, can be uniformly discharged across the entire width of the discharge device, such as a discharge roll, located underneath and operatively associated with the bottom of the retorts. When the width is excessive, the heat processed or treated material will arch or drag along the excessively wide vertical side walls and will prevent uniform discharge of the material which will likewise interfere with the uniform treatment or processing of material and with the uniform downwardly flow of the material. The uniformly heat-treated material is uniformly discharged in a dry manner via a dry discharge roll which is cooled internally by a coolant, such as water. Such type of dry discharge permits uniform heating down to the level of discharge, even at high coking, charring, or treating temperatures. In most prior retorts, the hot material was partially heat quenched by the admission of steam at the bottom of the retort or the hot material dropped into a water-quenching system. For the purpose of producing an effective discharge of the material, the discharge roll has special, helically-disposed teeth provided with pockets for discharging the hot coke, char, etc., in small batches progressively across the entire width of the bottom of the retort without simultaneously removing and discharging the material across the entire width of the discharge roll in large quantities which would have the tendency to disturb the entire vertical column of material in the retort and to interfere with the uniform and complete treatment of the material flowing or moving through the retort. The through-put and capacity of each retort is controlled mechanically by suitable means operatively connected to the discharge rolls, such as a combination of motor drive and gear reducers (see Figs. 1 to 4).

Interposed between the top supply bunker and each one of the twin retorts is a quick-acting water seal which is capable of making a positive seal. By using such a water seal, leakage of air into each retort or loss of evolved gases therefrom is prevented. Those skilled in the art will appreciate the importance of this feature when carrying the invention into practice on an industrial scale.

At the bottom of each retort, a discharge system is provided with a horizontally sliding damper and a water seal damper. These dampers are used alternately for the batch discharge of the coke, char, etc., without interfering with the continuous operation of the heat processing or treatment section of each retort. By specially constructing the heat processing section as a floating heating section, the difference in expansion between the heating section and surrounding brickwork is taken care of. At the same time, the heating section and brickwork are bonded together in such a manner that the "hammer head" silicon carbide shapes (see Figs. 6, 7, and 12) can slide freely horizontally and vertically and still retain the uniform taper in the side walls of the heating section.

Figure 5:
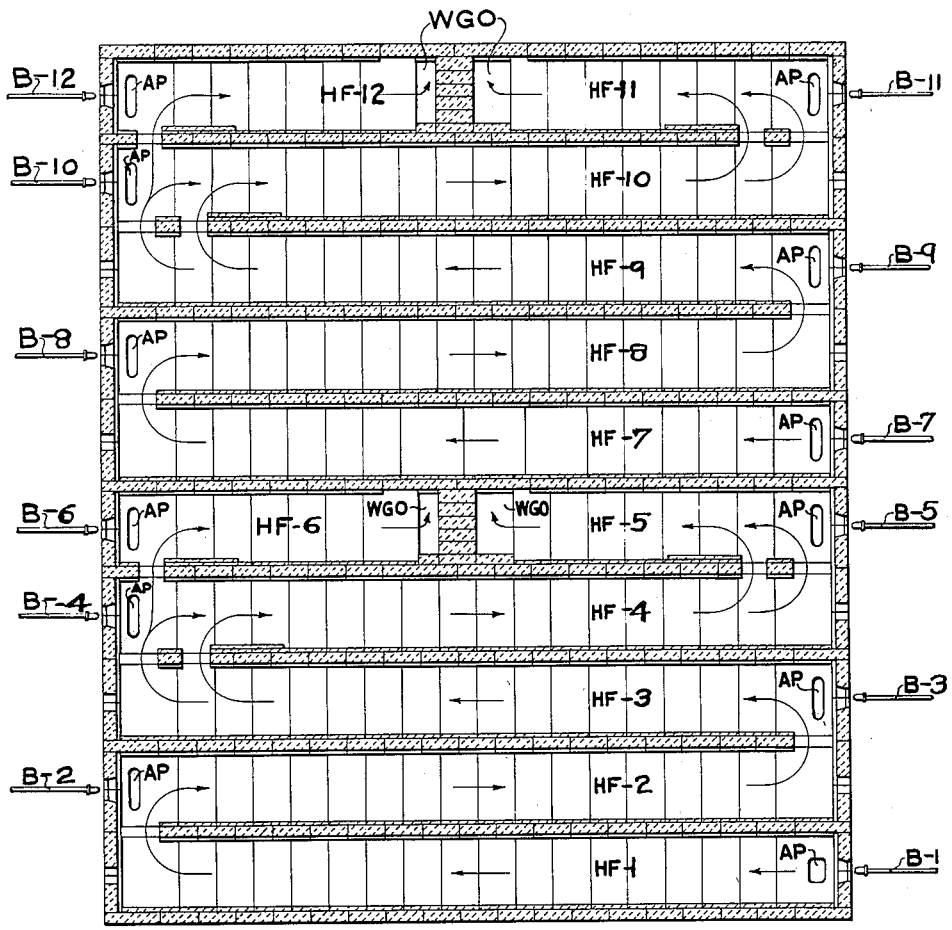
Fig. 5 is a vertical sectional view taken on line 5—5 of Fig. 7.
Figure 9:
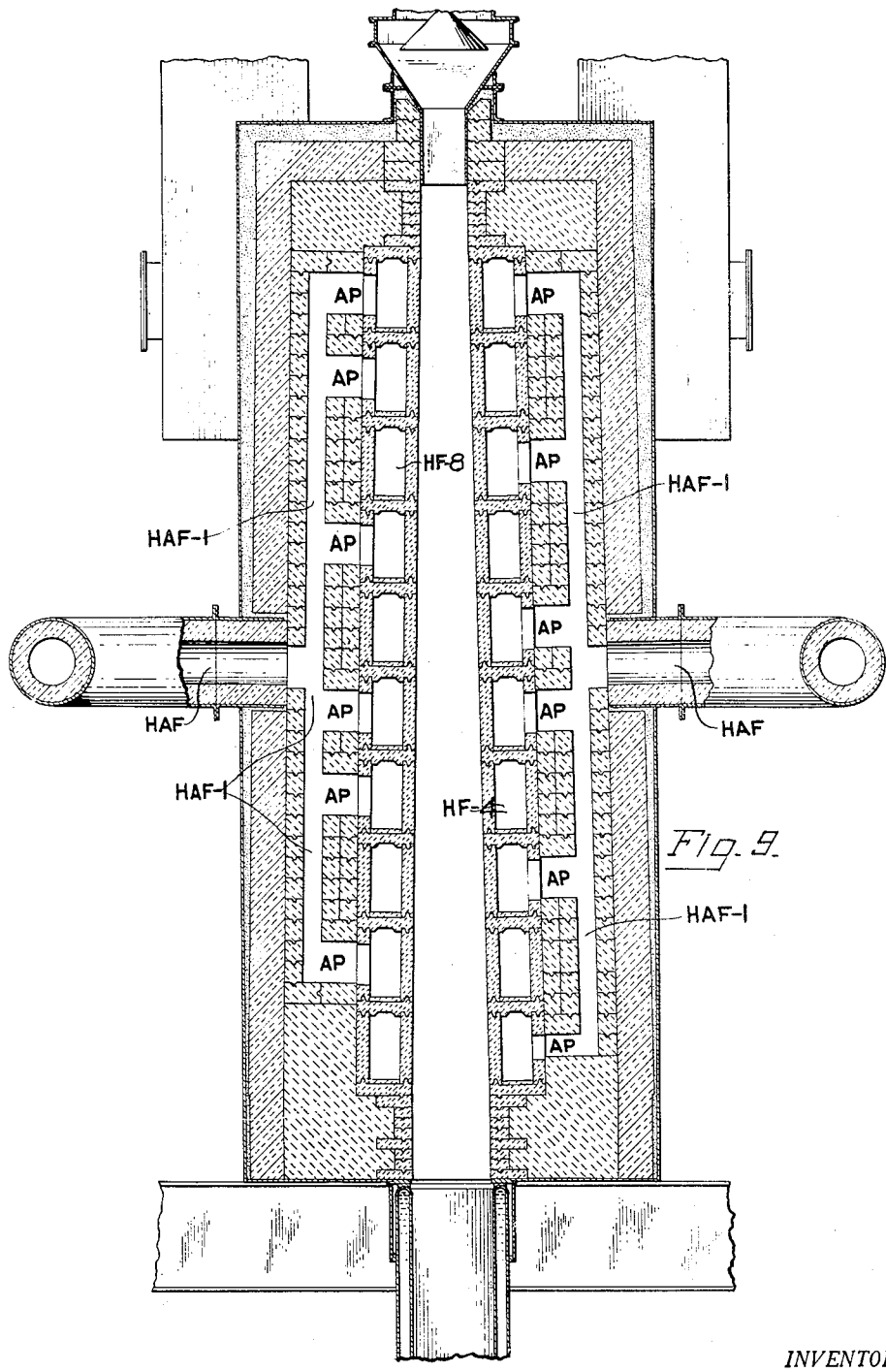
Fig. 9 is a vertical cross sectional view taken on the line 9—9 of Fig. 3.

Directly connected to the horizontal heating system is a tubular recuperator which is preferably mounted near the upper part or top of the retort (see Figs. 3, 5, and 9). The hot products of combustion coming from the heating system are used in the recuperator to preheat the air required for supporting combustion of the fuel supplied by the burners associated with the horizontal flues of the heating system. To effect a rapid flow of the air through the silicon carbide recuperator tubes, an air blower (not shown) is provided as will be readily understood by those skilled in the art. The supply of preheated air to each burner is controlled by a slide damper (see Figs. 6 and 13).

The improved vertical retort has a unique construction which permits the unusual operation of batch feed and batch discharge while at the same time effecting continuous heat treatment or processing. Those skilled in the art will appreciate that from a practical viewpoint the batch feed system permits the inspection and the removal of foreign matter from the raw material or feed stock and prevents damage to the walls of the coking section of the retort which is very important. For example, green petroleum or delayed coker coke is delivered in freight cars and quite often contains foreign matter, such as stone, slate, scrap iron, etc., which must be removed in order to prevent damage to the retorts.

The construction and operation of the improved vertical retorts can be best understood by referring to the drawings, particularly Figs. 1 and 4. In order to fill each retort or heat-treating chamber or retorts R–1 and R–2, water seals WS–2 in water seal valves WS–1 at the bottom of the retorts are closed. Rolls DR are stationary. At the feed end the water seals WS–3 and water seal valves WS are open. Bell valves BV in hoppers FH are likewise open and by opening gates G carbonaceous material from storage bin SB flows through the open valves and is deposited on rolls DR. When the retorts have been filled to the top of each retort, the bell valves BV are closed and hopper FH is filled with carbonaceous material. When the hopper is full, the gates G are closed and water seals WS–3 in water sealed valves WS are closed. Bell valves BV in housings FH are then opened. The water cooled rolls DR are placed in operation by motor drives RD and the heat-treated material is discharged slowly into water cooled hoppers CSH. Whenever the hopper CSH is full, the sliding dampers SD are closed and the water seal valve WS–1 in water sealed valves WS–2 are opened and the material is discharged into track hopper RH and then into drag conveyor DC. During this short interval, the material is building up on the valve surface of the sliding damper SD. Water seal valve WS–2 is closed and sliding valve SD opened and hopper CSH is again filled with the material from roll DR which operates continuously.

To provide for a constant supply of material whenever hoppers FH are empty, bell valves BV are closed and again filled by opening and closing the water sealed valves WS–3 and gates G. The temperature of the heat-treated carbonaceous material leaving the bottom of the retorts R–1 and R–2 is about 1700° F. This temperature is reduced when the hot material passes the water cooled surfaces WCS to a temperature of about 1000° F. which requires the discharge rolls DR to be water cooled (see Figs. 1, 10, and 11). The discharge rolls empty the heat-treated carbonaceous material into hoppers CSH where the temperature is reduced to around 500° F. by water cooled surfaces WCS.

Cooling water for cooling the water cooled discharge rolls DR (see Figs. 10 and 11) enters supply pipe W, flows through hollow shaft HS into inlet port or opening OW and into shaft casing SC and water compartments WC, and then flows constantly through openings WF which are provided in each fin wall FW connecting hollow shaft HS with outer shaft casing SC. The entire assembly of hollow shaft HS and casing SC is filled with flowing water at all times. The hot water coming from compartments WC flows through overflow pipe OF and is constantly discharged through water pipe W–1.

The fin walls FW which extend beyond the surface of roll casing SC are used for holding the removable roll teeth RT in place. The descending heat-treated material is deposited in pockets P formed by the removable roll teeth RT. In this manner, a constant discharge of a limited amount of the material is insured by the slowly revolving roll DR which is operated by the roll drives RD (see Figs. 1 and 2). The retorts R–1 and R–2 have a horizontally disposed heating system common to both retorts as may be seen from Figs. 3 and 4 and particularly from Figs. 5, 6, and 7.

Figure 8:
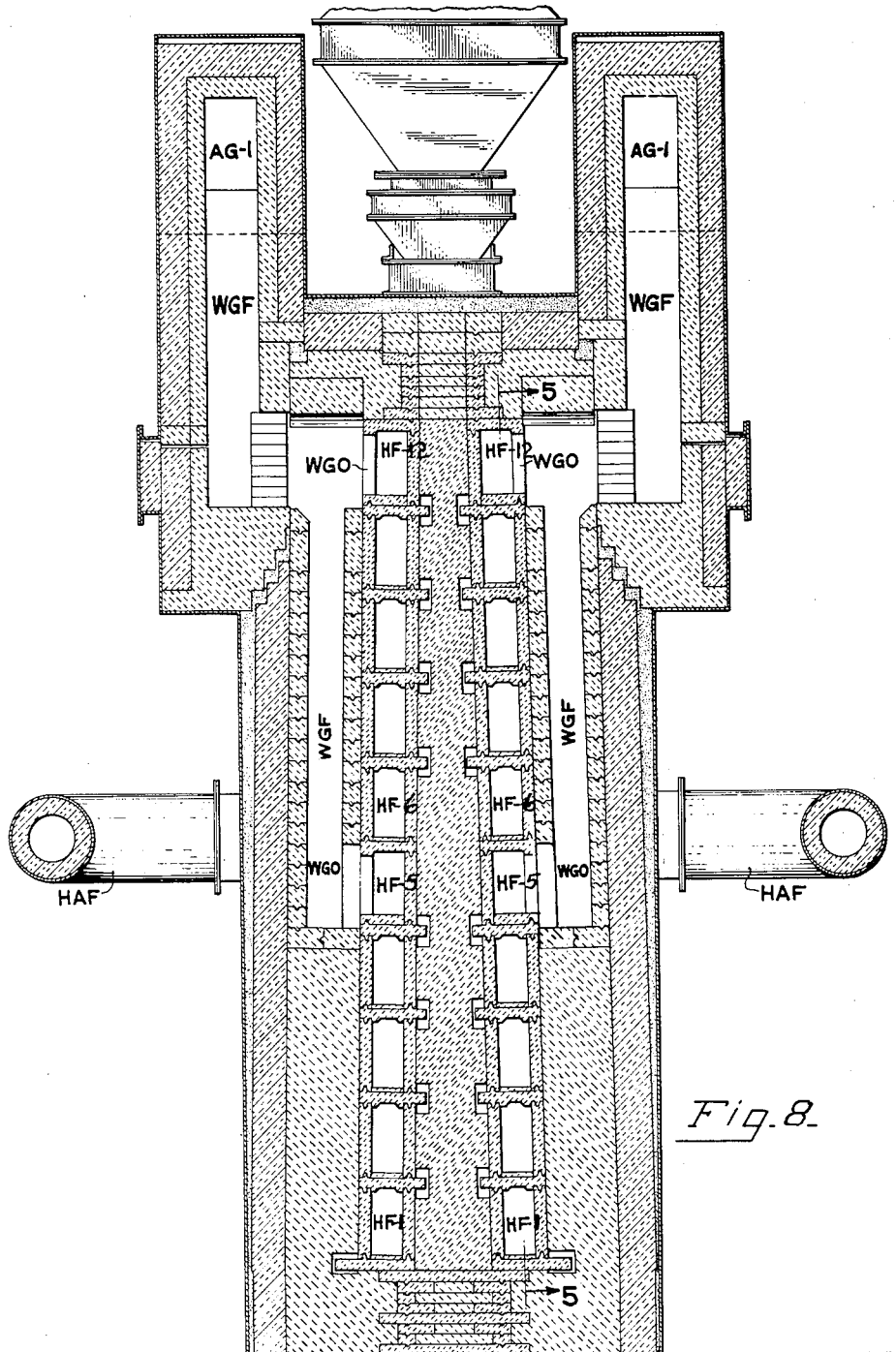
Fig. 8 is a vertical cross sectional view taken on the line 8—8 of Fig. 3.

The heating flues HF are preferably constructed of silicon carbide refractory materials to provide a maximum heat transfer required per square foot of heating surface per hour which is necessary for the rapid heat processing of the carbonaceous material. The fuel for heating the retorts can be an appropriate type, such as rich gas or fuel oil. Burners B are located at alternate ends of each horizontal heating flue. Due to the necessary height or depth of each retort, the horizontal heating flue system is divided into two parts (lower and upper) which are not interconnected. The waste gases or products of combustion are collected in a common off-take flue WGF (see Fig. 8).

The heating system functions in the following manner. Fuel is burned simultaneously in all heating flues HF–1 to HF–12. The hot combustion products from burner B–1 and flue HF, enter heating flue HF–1 and flow through heating flues HF–2, HF–3, HF–4, and HF–5 and exit through opening WGO (see Fig. 8) into waste gas flue WGF, then into upper waste gas flues AG–1 and finally into tubular recuperator TR. The combustion products from heating flues HF–6 to HF–12 likewise flow into waste gas flues WGF, and AG–1 to tubular recuperator TR. The air for combustion used in the heating flues HF–1 to HF–12 on both sides of each retort is supplied by an appropriate air blower (not shown) to all the hollow silicon carbide tubes ST in recuperator TR (see Fig. 3) where the air is preheated to a temperature of about 1400° F. from the sensible heat in the waste heat products from all heating flues which flow around the hollow tubes. The air to be preheated flows through the hollow tubes into downcomer flues HAF (see Fig. 3) to each side of each retort (see Figs. 1 and 4), into air risers HAF (see Fig. 9), through hot air ports AP, and into each heating flue HF–1 to HF–12. The flow of preheated air to each heating flue is regulated by slide dampers VSD (see Figs. 6 and 13).

The improved retort has the feed end of the retort narrower than the discharge end of the retort for the purpose of providing a free flow of the heat-treated material downwardly through the retort. To provide such a taper requires the use of special brickwork construction to hold the silicon carbide heating flue shapes in their laid-up positions. Such special shapes may be seen in Figs. 6, 7, 8, and 12 and particularly Figs. 6, 7, and 12. The division wall DW (see Fig. 7) separating each heating flue is provided with a multiplicity of special shapes IBS (see Figs. 6 and 12) contoured as to interlock with shapes IS located in the main wall construction MW, and which prevent the silicon carbide walls from gaining additional wall taper. A free space FS above and below and at the sides of shapes IBS permits the free movement of the wall MW and heating flue brickwork due to uneven expansion of the various refractory materials. The evolved gases from each retort flow upwardly and out of each retort through gas off-take GO (see Fig. 3) into the standard pipes (not shown) which conduct the gases to any standard by-product or oil refinery equipment.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. Improved, continuously-operated vertical twin retorts adapted for the heat treatment of carbonaceous material at high temperatures required for calcining, charring, coking and for removing gases and volatiles from said carbonaceous material and capable of yielding controlled high temperatures within a range of about 1700° F. up to about 2400° F. to effect a desired high heat treatment of said carbonaceous materials for the production of char, coke, and calcined carbonaceous material, gases, volatiles and/or by-products which comprises twin, externally-heated vertical retorts in tandem having their narrow ends adjacent to each other and their wide sides in alignment with each other and adapted for high temperature heat treatment, said retorts having their feed ends at the top narrower than their discharge ends at the bottom to provide a taper to permit a free flow of the heat treated material downwardly in a vertical direction through the retort, a heating flue system common to said twin retorts made of silicon carbide and adapted for high conductivity of heat at high temperatures of the order of about 2000° F., said heating flue system constructed as a floating unit within the retorts and having horizontal flues externally and operatively associated with the wide sides thereof, means incorporated in said heating flue system and arranged for controlling the temperatures in each horizontal heating flue from the bottom to the top in such a manner as to insure substantially uniform transfer of heat rapidly and uniformly to carbonaceous material under treatment within said retorts, interlocking shapes projecting from the outermost part of the heating flue system and so arranged to allow vertical and horizontal expansion without subjecting the heating flue system to failure by collapse or otherwise, back-up brickwork surrounding said twin retorts and said horizontal heating flue system and made of a refractory material capable of withstanding heat coming from said retorts when at high temperatures within a range of about 1700° F. to about 2400° F., interlocking shapes incorporated within said brickwork to interlock with the interlocking shapes of the heating flue system in such a manner as to leave a free space permitting free vertical and horizontal movement of the interlocking shapes due to differences in expansion and growth of the heating flue system and the back-up brickwork, a tubular recuperator directly connected to said heating flue system for removing the hot gases therefrom and for preheating air going to the horizontal flues of said heating flue system, means for controlling preheated air supplied by said tubular recuperator to each horizontal flue whereby the temperatures in each heating flue can be controlled from the lowest at the top of the retorts to the highest at the bottom thereof, a supply hopper connected to both of said twin retorts with a gas-tight seal for supplying said carbonaceous material thereto whereby the charging of the material into the hopper can be effected with selected short cycles proportioned not only to the discharge of heat-treated material but also to the continuous travel of the material through the retorts, a dry discharge system located at the bottom of the retorts and having a gas-tight connection thereto for controlling the downward flow of the material under treatment through said twin retorts without crushing the same, for lowering the temperature of the heat-treated material to a temperature where such material will not ignite when coming into contact with the atmosphere and for discharging the heat-treated material as a cooled finished product in a dry manner, and a dry-cooled receiving hopper operatively associated with said dry discharge system in a gas-tight manner whereby said cooled finished product can be discharged intermittently and whereby a marketable product having a selected quality and produced in a selected quantity is assured.

2. Improved, continuously-operated vertical twin retorts adapted for the heat treatment of carbonaceous material at high temperatures required for calcining, charring, coking and for removing gases and volatiles from said carbonaceous material and capable of yielding controlled high temperatures within a range of about 2000° F. up to about 2400° F. to effect a desired high heat treatment of said carbonaceous materials for the production of char, coke, and calcined carbonaceous material, gases, volatiles and/or by-products which comprises twin, externally-heated vertical retorts in tandem having their narrow ends adjacent to each other and their wide sides in alignment with each other and adapted for high temperature heat treatment, said retorts made of silicon carbide shapes and having their feed ends at the top narrower than their discharge ends at the bottom to provide a taper to permit a free flow of the heat treated material downwardly in a vertical direction through the retort, a heating flue system common to said twin retorts made of silicon carbide shapes for high conductivity of heat at high temperatures of the order of at least about 2000° F. and higher and having circuitous horizontal flues externally and operatively associated with the wide sides thereof, said heating flue system arranged to expand and contract freely with temperature changes, means mounted within said heating system for controlling the temperatures in each horizontal heating flue from the bottom to the top in such a manner as to insure substantially uniform transfer of heat rapidly and uniformly to carbonaceous material under treatment within said retorts and said heating flue system having interlocking "hammer-head" shapes so arranged to allow vertical and horizontal expansion without subjecting the heating flue system to failure by collapse or otherwise, back-up brickwork surrounding said twin retorts and said horizontal heating flue system and provided with interlocking shapes to interlock with the interlocking shapes of the heating flue system in such a manner as to leave a free space permitting free vertical and horizontal movement of the interlocking shapes due to differences in expansion and growth of the heating flue system and the back-up brickwork, said back-up brickwork made of a refractory material capable of withstanding heat coming from said retorts when at high temperatures within a range of about 2000° F. to about 2400° F., a tubular recuperator provided with silicon carbide tubes and directly connected to said heating flue system for removing the hot gases therefrom and for preheating air going to the horizontal flues of said heating flue system, means for controlling preheated air supplied by said tubular recuperator to each horizontal flue whereby the temperatures in each heating flue can be controlled from the lowest at the top of the retorts to the highest at the bottom thereof, a supply hopper conneced to both of said twin retorts with a gas-tight seal for supplying said carbonaceous material thereto whereby the charging of the material into the hopper can be effected with selected short cycles proportioned not only to the discharge of heat-treated material but also to the continuous travel of the material through the retorts, a dry discharge system including water-cooled rolls located at the bottom of the retorts and having a gas-tight connection with said retorts for controlling the downward flow of the material under treatment through said twin retorts without crushing the same, for lowering the temperature of the heat-treated material to a temperature where such material will not ignite when coming into contact with the atmosphere and for discharging the heat-treated material as a cooled finished product in a dry manner, and a water-cooled receiving hopper operatively associated with said dry discharge system in a gas-tight manner whereby said cooled finished product can be discharged intermittently and whereby a marketable product having a selected quality and produced in a selected quantity is assured.

3. Improved, continuously-operated vertical twin retorts adapted for the heat treatment of carbonaceous material at high temperatures required for calcining, charring, coking and for removing gases and volatiles and capable of yielding controlled high temperatures within a range of about 1700° F. up to about 2400° F. to effect a desired high heat treatment of carbonaceous materials for the production of char, coke, and calcined carbonaceous material, gases, volatiles and/or by-products which comprises twin, externally-heated vertical retorts in tandem having their narrow ends adjacent to each other and their wide sides in alignment with each other and adapted for high temperature heat treatment, said retorts having their feed ends at the top narrower than their discharge ends at the bottom to provide a taper to effect a free flow of the heat treated material downwardly in a vertical direction through the retort, a heating flue system common to said twin retorts made of silicon carbide and adapted for high conductivity of heat at high temperatures of the order of about 2000° F., said heating flue system having two sets of superimposed, series-connected horizontal flues externally and operatively associated with the wide sides thereof and said heating flue system arranged to expand and contract freely with temperature changes and to control the temperatures in each horizontal heating flue from the bottom to the top in such a manner as to insure substantially uniform transfer of heat rapidly and uniformly to carbonaceous material under treatment within said retorts and said heating flue system having interlocking "hammerhead" shapes so arranged to allow vertical and horizontal expansion without subjecting the heating flue system to failure by collapse or otherwise, back-up brickwork surrounding said twin retorts and said horizontal heating flue system and provided with interlocking shapes to interlock with the interlocking shapes of the heating flue system in such a manner as to leave a free space permitting free vertical and horizontal movement of the interlocking shapes due to the differences in expansion and growth of the heating flue system and the back-up brickwork, said back-up brickwork made of a refractory material capable of withstanding heat coming from said retorts when at high temperatures within a range of about 2000° F. to about 2400° F., a tubular recuperator directly provided with silicon carbide tubes and connected to each set of said series-connected heating flues for removing the hot gases therefrom and for preheating air going to each of the horizontal flues of each set of said series-connected flues, damper means mounted in said heating flue system for controlling preheated air supplied by said tubular recuperator to each horizontal flue whereby the temperatures in each heating flue can be controlled from the lowest at the top of the retorts to the highest at the bottom thereof, a supply hopper connected to both of said twin retorts with a gas-tight seal for supplying said carbonaceous material thereto whereby the charging of the material into the hopper can be effected with selected short cycles proportioned not only to the discharge of heat-treated material but also to the continuous travel of the material through the retorts, a dry discharge system located at the bottom of the retorts and having a gas-tight connection with said retorts for controlling the downward flow of the material under treatment through said twin retorts without crushing the same, for lowering the temperature of the heat-treated material to a temperature where such material will not ignite when coming into contact with the atmosphere and for discharging the heat-treated material as a cooled finished product in a dry manner, and a dry-cooled receiving hopper operatively associated with said dry discharge system in a gas-tight manner whereby said cooled finished product can be discharged intermittently and whereby a marketable product having a selected quality and produced in a selected quantity is assured.

4. Improved, continuously-operated, vertical twin retorts adapted for the heat treatment of carbonaceous material at high temperatures required for calcining, charring, coking and for removing gases and volatiles from said carbonaceous material and capable of yielding controlled high temperatures within a range of about 1700° F. up to about 2400° F. to effect a desired high heat treatment of said carbonaceous materials for the production of char, coke, and calcined carbonaceous material, gases, volatiles and/or by-products which comprises twin, externally-heated vertical retorts in tandem having their narrow ends adjacent to each other and their wide sides in alignment with each other and adapted for high temperature heat treatment, said retorts having their feed ends at the top narrower than their discharge ends at the bottom to provide a taper to permit a free flow of the heat treated material downwardly in a vertical direction through the retort, a heating flue system common to each wide side of said twin retorts and operatively associated with the wide sides thereof, said heating flue system made of silicon carbide and adapted for high conductivity of heat at high temperatures of the order of about 2000° F., two sets of superimposed, series-connected heating flues incorporated in said heating flue system on each of the wide sides of said twin retorts and constructed in such a manner as to expand and contract with changes in temperatures, a plurality of burners arranged at alternate ends of said heating flues to provide a circuitous stream of flames and hot heating gases in each of said sets, damper means incorporated in said heating flue system adjacent to each of said burners and arranged for controlling the temperatures in each horizontal heating flue from the bottom to the top in such a manner as to insure substantially uniform transfer of heat rapidly and uniformly to carbonaceous material under treatment within said retorts, "hammer-head" interlocking shapes projecting from the outermost part of the heating flue system and so arranged to allow vertical and horizontal expansion without subjecting the heating flue system to failure by collapse or otherwise, back-up brickwork surrounding said twin retorts and said horizontal heating flue system and made of a refractory material capable of withstanding heat coming from said retorts when at high temperatures within a range of about 1700° F. to about 2400° F., interlocking shapes incorporated within said brickwork to interlock with the interlocking shapes of the heating flue system in such a manner as to leave a free space permitting free vertical and horizontal movement of the interlocking shapes due to differences in expansion and growth of the heating flue system and the back-up brickwork, a tubular recuperator provided with silicon carbide tubes and directly connected to outlets of each set of horizontal flues in said heating flue system for removing the hot gases therefrom and for preheating air going to the horizontal flues of said heating flue system, said preheated air supplied by said tubular recuperator to each horizontal flue being controlled by the aforesaid damper means provided in said heating flue system whereby the temperatures in each heating flue can be controlled from the lowest temperature at the top of the retorts to the highest temperature at the bottom thereof, a supply hopper connected to both of said twin retorts with a gas-tight seal for supplying said carbonaceous material thereto whereby the charging of the material into the hopper can be effected with selected short cycles proportioned not only to the discharge of heat-treated material but also to the continuous downward travel of the material through the retorts, a dry discharge system including a water-cooled discharge roll located at the bottom of the retorts and having a gas-tight connection thereto for controlling the downward flow of the vertical columns of material under treatment in said twin retorts without crushing the same, for lowering the temperature of the heat-treated material to a temperature where such material will not ignite when coming into contact with the atmosphere, and for discharging the heat-treated material as a cooled finished product in a dry manner, said discharge roll having helically-disposed teeth provided with pockets for discharging the hot coke, char, etc., in small batches progressively across the entire width of the bottom of the retort without simultaneously removing and discharging the material across the entire width of the discharge roll in large quantities which would have the tendency to disturb the entire vertical columns of material in the retorts and to interfere with the uniform and complete treatment of the material moving downwardly through the retorts, and a dry-cooled receiving hopper provided with water-cooling means and operatively associated with said dry discharge system in a gas-tight manner whereby said cooled finished product can be discharged intermittently and whereby a marketable product having a selected quality and produced in a selected quantity is assured.

5. The improved, continuously-operated vertical twin retorts set forth in claim 1 in which the water-cooled discharge means comprises a discharge roll having special water-cooled discharge rolls located at the bottom of the retorts for controlling the downward flow of the material under treatment through said twin retorts without crushing the same and for lowering the temperature of the heat-treated material to a temperature where such material will not ignite when coming into contact with the atmosphere.

6. The improved, continuously-operated vertical twin retorts set forth in claim 1 in which the width of each retort is restricted up to about six feet and the narrow end up to about two feet.

7. The improved, continuously-operated vertical twin retorts set forth in claim 1 in which the heating flue system is circuitous and in which a burner is provided in each horizontal flue.

8. The improved, continuously-operated vertical twin retorts set forth in claim 1 in which said retorts are enclosed in a steel shell having sections capable of expanding as required to compensate for the difference in expansion and growth of the twin retorts and horizontal heating flue system made of silicon carbide and the back-up brickwork made of another refractory.

References Cited in the file of this patent

UNITED STATES PATENTS

| | | |
|---|---|---|
| 873,647 | Young et al. | Dec. 10, 1907 |
| 1,093,936 | Koppers | Apr. 21, 1914 |
| 1,355,530 | Birkholz | Oct. 12, 1920 |
| 1,713,032 | Debauche | May 14, 1929 |
| 1,873,075 | Van Ackeren | Aug. 23, 1932 |
| 2,008,334 | Niles | July 16, 1935 |
| 2,158,139 | McIntire | May 16, 1939 |
| 2,637,685 | Petit | May 5, 1953 |

FOREIGN PATENTS

| | | |
|---|---|---|
| 142 | Australia | Jan. 14 1936 |
| 105,236 | Australia | Sept. 20, 1938 |
| 340,670 | Italy | May 25, 1936 |